United States Patent Office 3,370,107
Patented Feb. 20, 1968

---

3,370,107
MIXTURES OF POLYACRYLATES AND
POLYARYLENE POLYETHERS
Bruce P. Barth, Somerville, N.J., assignor to Union Carbide Corporation, a corporation of New York
No Drawing. Filed July 6, 1965, Ser. No. 469,841
12 Claims. (Cl. 260—901)

This invention relates to mixtures of polyacrylates and polyarylene polyethers, and in particular to such mixtures characterized by improved notched impact strength and improved resistance to thermal stress embrittlement.

Polyarylene polyethers are substantially linear thermoplastic polymers that exhibit excellent mechanical, physical, chemical, and electrical properties, and are especially attractive for their superior thermal properties. These polymers can be molded by conventional techniques into shaped articles for a wide variety of end uses. These polymers are ductile, machinable, self-extinguishing, and non-dripping, and are inert to both mineral acid and caustic. More importantly, because of the superior thermal properties of these polymers, they retain their properties at elevated temperatures surpassing the elevated temperature capabilities of prior melt fabricable thermoplastic materials. However, it has been found that polyarylene polyethers while possessing superior thermal properties, undergo undesirable thermal stress embrittlement. That is, load bearing or stressed articles molded from polyarylene polyethers will crack and craze when exposed to the same elevated temperatures that an unstressed article would otherwise withstand. In addition, it has also been found that polyarylene polyethers are notch sensitive, that is, they exhibit relatively low Izod Impact (ASTM D256) values as compared to other engineering thermoplastic materials such as polycarbonates for example.

Unexpectedly, it has now been discovered that polyarylene polyethers are greatly improved in notched impact strength and resistance to thermal stress embrittlement by adding thereto from about 0.1 to about 20 parts by weight of a polyacrylate based on the weight of the polyarylene polyether. Of note is the fact that the incorporation of polyacrylates in polyarylene polyethers does not adversely effect the desirable properties of the polyarylene polyether. It was also found that the incorporation of polyacrylate into polyarylene polyether improves their processability.

Thermoplastic polyarylene polyethers used in the present invention are linear thermoplastic polymers having a basic structure composed of recurring units having the formula

—O—E—O—E'— wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl)propane, 1,1 - bis - (4-hydroxyphenyl)-2-phenylethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, either oxygen (—O—), carbonyl (—CO—), sulfide (—S—), sulfone (—SO$_2$—), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

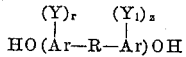

wherein Ar is an aromatic group and preferably is a phenylene group, Y and Y$_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4 inclusive, and R is representative of a bond between aromatic carbon atoms as in dihydroxydiphenyl, or is a divalent radical, including for example, inorganic radicals as —CO—, —O—, —S—, —S—S—, —SO$_2$—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane,
2,4'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropane
and the like;

Di(hydroxyphenyl)sulfones such as bis-(4-hydroxyphenyl) sulfone, 2,4'-dihydroxydiphenyl sulfone, 5'-chloro-2,4'-dihydroxydiphenyl sulfone, 5-chloro-4,4'-dihydroxydiphenyl sulfone, and the like;

Di(hydroxyphenyl)ethers such as bis-(4-hydroxyphenyl)ether, the 4,3'-, 4,2'-, 2,2'-, 2,3'-dihydroxydiphenyl ethers, 4,4'-dihydroxy-2,6-dimethyldiphenyl ether, bis-4-hydroxy-3-isobutylphenylether, bis - (4-hydroxy-3-isopropylphenyl)ether, bis - (4-hydroxy-3-chlorophenyl)ether, bis-(4-hydroxy-3-fluorophenyl)ether, bis - (4-hydroxy-3-bromophenyl)ether, bis-(4-hydroxynaphthyl)ether, bis(4-hydroxy-3-chloronaphthyl)ether, 4,4' - dihydroxy - 3,6-dimethoxydiphenyl ether, 4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compounds or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para positions of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group ($-SO_2-$) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart, Rev., 12, 1 (1958).

The electron withdrawing group of the dihalobenzenoid compound can function either through the resonance of the aromatic ring, as indicated by those groups having a high sigma* value, i.e. above about +0.07 or by induction as in perfluoro compounds and like electron sinks.

Preferably the activating group should have a high sigma* value, preferably about 1.0, although sufficient activity is evidenced in those groups having a sigma* value above 0.7.

The activating group can be basically either of two types:

(a) monovalent groups that activate one or more halogens on the same ring as a nitro group, phenylsulfone, or alkylsulfone, cyano, trifluoromethyl, nitroso, and hetero nitrogen as in pyridine.

(b) divalent groups which can activate displacement of halogens on two different rings, such as the sulfone group $-SO_2-$; the carbonyl group $-CO-$; the vinyl group $-CH=CH-$; the sulfoxide group $-SO-$; the azo group $-N=N-$; the saturated fluorocarbon groups $-CF_2-CF_2-$; organic phosphine oxides

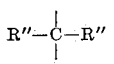

where R is a hydrocarbon group, and the ethylidene group

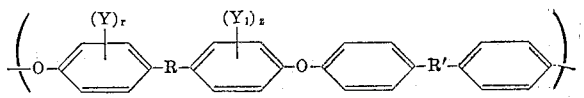

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive. Even more preferred are the thermoplastic polyarylene polyethers of the above formula wherein r and z are zero, R is divalent connecting radical

wherein R" represents a member of the group consisting of hydrogen, lower alkyl, lower aryl, and the halogen substituted groups thereof, and R' is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

The specific solvents employed have the formula $R-S(O)_z-R$ wherein each R represents a monovalent lower hydrocarbon group free of aliphatic insaturation on the alpha carbon atom, and preferably contains less than about 8 carbon atoms or when connected together represents a divalent alkylene group with z being an integer from 1 to 2 inclusive. In all of these solvents, all oxygens and two carbon atoms are bonded directly to the sulfur atom. Specifically mentionable of these solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane), tetrahydrothiophene-1 monoxide, and the like.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

In the polymerization reactions described herein substantially anhydrous conditions are maintained before and during the reaction. While amounts of water up to about one percent can be tolerated amounts of water substantially greater than this are desirably avoided. In order to secure high molecular weight polymers, the system should be substantially anhydrous, and preferably with less than 0.5 percent by weight water in the reaction mixtures.

In the two-step process described above, where the alkali metal salt of the dihydric phenol is prepared in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture. Benzene, xylene, halogenated benzenes or other inert organic azeotrope-forming organic liquids are suitable for this purpose.

The azeotrope former can be one either miscible or immiscible with the sulfone or sulfoxide major solvent. If it is not miscible it should be one which will not cause precipitation of the polymer in the reaction mass. Heptane is such a solvent. It is preferred to employ azeotrope formers which are miscible with the major solvents and which also act as cosolvents for the polymer during polymerization. Chlorobenzene, dichlorobenzene and xylene are azeotrope formers of this class. Preferably the azeotrope former should be one boiling below the decomposition temperature of the major solvent and be preferably stable and inert in the process, particularly inert to the alkali metal hydroxide when the alkali metal salt of the dihydric phenol is prepared in situ in the presence of the inert diluent or azeotrope former. It has been found that chlorobenzene and o-dichlorobenzene serve particularly well as the inert diluent and are able to significantly reduce the amount of the sulfone or sulfoxide solvent necessary. The cosolvent mixture using even as much as 50 percent of the halogenated benzene with dimethylsulfoxide, for example not only permits the former polymer to remain in solution and thus produce high molecular weight polymers, but also provides a very economical processing system, and an effective dehydration operation.

The reaction between the dihalobenzenoid compound and the alkali metal salt of the bisphenol proceeds on an equimolar basis. This can be slightly varied but as little a variation of 5 percent away from equal molar amounts seriously reduces the molecular weight of the polymers.

The reaction of the dihalobenzenoid compound with the alkali metal salt of the dihydric phenol readily proceeds without need of an added catalyst upon the application of heat to such a mixture in the selected sulfone or sulfoxide solvent.

Also desirable is the exclusion of oxygen from the reaction mass to avoid any possibility of oxidative attack to the polymer or to the principal solvent during polymerization.

Reaction temperatures above room temperature and generally above 100° C. are preferred. More preferred are temperatures between about 120° C. to 160° C. Higher temperatures can of course be employed, if desired, provided that care is taken to prevent degradation or decomposition of the reactants, the polymer and solvents employed. Also temperatures higher than 100° C. are preferred in order to keep the polymer in solution during the reaction since these sulfoxide and sulfone solvents are not particularly good solvents for the polymer except in the hot condition.

The polymer is recovered from the reaction mass in any convenient manner such as by precipitation induced by cooling the reaction mass or by adding a nonsolvent for the polymer, or the solid polymer can be recovered by stripping off the solvent at reduced pressures or elevated temperatures.

Since the polymerization reaction results in the formation of the alkali metal halide on each coupling reaction, it is preferred to either filter the salts from the polymer solution or to wash the polymer to substantially free it from these salts.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

Any of the well known polyacrylates can be used in the present invention. Suitable polyacrylates are composed of recurring units having the formula

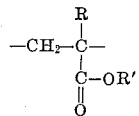

wherein R is hydrogen or methyl and R' is an alkyl group of 1 to 18 carbon atoms inclusive, an alkoxyalkyl group of 1 to 18 carbon atoms inclusive, an aralkyl group of 7 to 18 carbon atoms inclusive, an aryl group of 6 to 18 carbon atoms inclusive, or an alkaryl group of 7 to 18 carbon atoms inclusive. Thus, as used herein the term "polyacrylates" is intended to include polyacrylates and polymethacrylates. See E. H. Riddle, Monomeric Acrylic Esters, New York Reinhold Publishing Corp. (1954). R' can be, for example methyl, ethyl, propyl, butyl, amyl, hexyl, heptyl, octyl, nonyl, decyl, dodecyl, tetradecyl, hexadecyl, heptadecyl, octadecyl, isopropyl, isobutyl, s-butyl, 2-methyl-1-butyl, 3-methyl-1-butyl, 3-pentyl, 2-methyl-1-pentyl, 2-ethyl-1-butyl, 4-methyl-2-pentyl, 2-heptyl, 2-ethylhexyl, 2-octyl, 5-methyl-2-nonyl, 2-methyl-7-ethyl-4-undecyl, cyclohexyl, 2-methylcyclohexyl, 2-methoxyethyl, 2 - ethoxyethyl, 3 - methoxypropyl, 4-ethoxybutyl, 4-ethoxyhexyl, 2-methoxydecyl, 6-butoxyhexyl, benzyl, α-phenylethyl, β-phenylethyl, 6-phenylhexyl, 2-methyl-7-phenyl-4-undecyl, 8-phenyloctyl, α-naphthylethyl, 4-naphthylbutyl, phenyl, tolyl, α-naphthyl, β-naphthyl, 4-ethylphenyl, 3-butylphenyl, 4-octylphenyl-4-octadecylphenyl, 4-methylnaphthyl, 4-propylnaphthyl, and the like. Polyacrylates can be prepared in any manner known in the art, for example, such as the methods described by Riddle, supra, and C. E. Schildknecht, Vinyl and Related Polymers, New York, John Wiley & Sons (1952), pp. 179–255.

Admixing the polymeric constituents can be accomplished in any manner as long as a thorough blending of the polyacrylate and polyarylene polyether is obtained. For example, admixing may be accomplished by a variety of methods normally employed for incorporation of plasticizers or fillers into thermoplastic materials including but not limited to mixing rolls, doughmixers, Banbury mixers, extruders, and other mixing equipment. The resulting mixtures may be handled in any conventional manner employed for the fabrication or manipulation of thermoplastic polymers. The mixtures can be molded using compression injection calendering and extrusion techniques. Alternatively, the admixing may be accomplished by mixing solutions of the two polymers which may thereafter be treated with a non-solvent to effect coprecipitation. Precipitated mixture may then be recoverd in a dry state after filtration to remove the non-solvent and final evaporation of residual solvent. Dry blending a mixture of the individual polymers followed by thermal fusion is a convenient means for producing a conventional molding compound. In this procedure, the dry blend may be extruded and chopped into pellets for subsequent use in injection molding procedures.

It has been found that the incorporation of a small amount, e.g. up to about 8 parts by weight, of finely divided silica promotes the formation of a homogeneous mixture.

The mixtures of this invention may contain other additives to plasticize, extend, lubricate, prevent oxidation or lend color to the mixtures. Such additives are well known in the art and may be incorporated without departing from the scope of the invention.

Because of their excellent physical, mechanical, chemical, electrical, and thermal properties, the mixtures of this invention have many and varied uses. For example, they can be used in molding powder formulations either alone or mixed with various fillers to make molded parts and articles such as gear, ratchets, bearings, cams, impact parts, gaskets, valve seats, bottles, containers, and the like. They can be used to prepare molded, calendered or extruded articles, films, coatings, threads, filaments, tapes and the like. They can be applied to a broad spectrum of uses in form of sheets, rods, tapes and the like and are useful in electrical applications.

Because of the adhesive characteristics of the mixtures of this invention, they can be advantageously employed in one or more decorative, protective, structural or bonding capacities to provide structural elements comprising an adherend and an adherent mixture of polyacrylate and polyarylene polyether as described herein.

The terms "structural element" and "structural elements" as used herein refer to an assembly or assemblies of one or more discrete, planar, curvilinear, rectangular, round or odd shaped objects and a polymeric mixture of this invention. The assembly is characterized by an adhesive bond between a mixture and the object or objects. The terms comprehend, therefore, structural elements comprising an adherend, such as a substrate and an adhering layer of polymeric mixture as in a two-ply laminate or a coated substrate; structural elements comprising an interlayer of polymeric mixture sandwiched between and adhered to two similar or dissimilar adherends or laminae as in a plural ply laminate; structural elements comprising a polymeric mixture matrix surrounding and adhered to as a bond and/or a support for variously shaped and sized adherends such as articles of varying porosities, for example, as the bonding agent and/or substrate in fiber-reinforced plastic articles; structural elements comprising structural members bonded together either closely adjacent or spaced apart by polymeric mixture elements; and combinations of the foregoing. The adherend preferably is readily wettable by the polymeric mixture either because of a polar nature such as characterizes metals, glass and wood and is absent in polyethylene or because of surface treatment or cleanliness or for any other reason.

Adherends having a tangible surface or surfaces, preferably a tangible wettable surface or surfaces, to which polyarylene polyether mixtures readily adhere include metals, polar materials, vitreous materials, proteinaceous materials, cutaneous materials, cellulosic materials, natural resins, synthetic organic polymeric material, nonmetallic materials, and the like. Adherends can be particulate, granular, fibrous, filamentary, ropy, woven, nonwoven, porous, nonporous, rigid and nonrigid.

In one embodiment, the mixtures of this invention are advantageously formed into sheets which are subsequently formed against an original shape such as a copper etched printing plate to form a matrix. The depth of an impression made in a matrix is more commonly referred to in the art as a "floor." Thus a matrix having an impression 30 mils deep is referred to as a matrix having 30-mil floor. In the copending application of J. B. Wheeler II, Ser. No. 365,797, filed May 7, 1964, there is described a thermoplastic matrix formed from a sheet of polyarylene polyether as described herein. The manner of forming such a matrix and the molding of duplicates from the matrix are also described in said application.

It has been found, however, that when sheets of polyarylene polyether are formed into a matrix, because of the low notched impact strength of the polyarylene polyether, the matrix tends to crack and even break in extreme cases when it is separated from the original against which it was formed. It has now been discovered that matrices formed from the mixtures of this invention will not break or crack when separated from an original.

Films formed from the mixtures of this invention by conventional techniques are useful as wrapping or packaging materials, as liners, for containers, covers, closures, and the like, as electrical insulating tapes, pipe coverings, and the like.

Because of their desirable properties, the mixtures of this invention can be used as an insulating material for electrical conductors such as wire and cable, as slot insulation in dynamelectric machines, as surface coverings for appliances and the like, as coatings for rods and the like, in wire enamels, varnishes, paints and the like.

The following examples are intended to further illustrate the present invention without limiting the same in any manner. Parts and percentages given are by weight unless indicated otherwise.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced Viscosity} = \frac{t_s - t_o}{c \cdot t_o}$$

wherein:
$t_o$ is the efflux time of the pure solvent.
$t_s$ is the efflux time of the polymer solution.
$c$ is the concentration of the polymer solution expressed in terms of grams of polymer per 100 ml. of solution.

EXAMPLE 1

*Preparation of thermoplastic polyarylene polyether*

In a 250 ml. flask equipped with a stirrer, thermometer, a water cooled condenser and a Dean Stark moisture trap filled with benzene, there were placed 11.42 grams of 2,2-bis(4-hydroxyphenyl)propane (0.05 mole), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130–135° C. consisting of the dipotassium salt of the 2,2-bis(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130–140° C. with good stirring for 4–5 hours. The viscous, orange solution was poured into 300 ml. water, rapidly circulating in a Waring Blendor, and the finely divided white polymer was filtered and then dried in a vacuum oven at 100°, for 16 hours. The yield was 22.2 g. (100%) and the reaction was 99% complete based on a titration for residual base.

The polymer had the basic structure

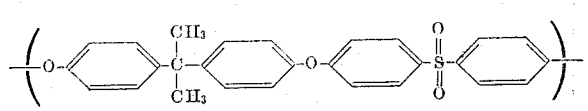

EXAMPLES 2-8

Polyarylene polyether prepared as in Example 1 was fluxed at 280° C., in a Brabender Plastograph mixer. Four percent silica and ten percent polyacrylate were then added and mixed for ten minutes. The mixture was compression molded into ⅛-inch test plaque at 288° C., and tested for notched Izod impact strength according to ASTM D256. Results are summarized below.

| Example No. | Polyarylene Polyether RV | Polyacrylate | Percent Polyacrylate | Polyacrylate RV in Cyclohexanone | Percent Silica | Izod Impact Strength (⅛" notched), ft. lbs./in. |
|---|---|---|---|---|---|---|
| 2 | 0.66 | Polyethylacrylate | 10 | 2.78 | 4 | 13.2 |
| 3 | 0.66 | ----do---- | 10 | 3.53 | 4 | 12.7 |
| 4 | 0.66 | Polybutylacrylate | 10 | 1.81 | 4 | 11.8 |
| 5 | 0.66 | ----do---- | 10 | 3.33 | 4 | 11.9 |
| 6 | 0.66 | Polyethylacrylate | 5 | 2.78 | 2 | 13.6 |
| 7 | 0.66 | ----do---- | 10 | 2.78 | 4 | 13.3 |
| 8 | 0.66 | ----do---- | 15 | 2.78 | 6 | 11.4 |
| Control | 0.66 | None | 0 | | | 1.0 |

These examples demonstrate that the incorporation of polyacrylates in polyarylene polyethers greatly improves the notched impact strength of the latter. The mixtures of these examples all exhibit an improvement in notched impact strength in excess of 1000 percent as compared to the control.

EXAMPLE 9

The mixtures of Examples 6 and 7 were formed into 6" x ⅛ x 0.02" samples and were wound in a helical fashion around #14 copper wire. A control was prepared in the same manner from unmodified polyarylene polyether prepared as in Example 1 having a RV of 0.66. The samples were aged overnight at 150° C. The samples prepared from the mixtures of Examples 6 and 7 showed no crazing or cracking and could be unwound from the wire without cracking. The control sample was badly cracked upon exposure to the same conditions. The samples prepared from the mixtures of Examples 6 and 7 were aged at 150° C. for three weeks and still did not show any crazing or cracking. The example aptly demonstrates the improvement in resistance to thermal stress embrittlement acquired by the incorporation of polyacrylates.

EXAMPLE 10

A mixture of 10 percent polyethylacrylate 0.2 percent phenyl beta-naphthylamine as an antioxidant and polyarylene polyether prepared as in Example 1 having a RV of 0.66 was prepared as in Examples 2–8 and wrapped onto wire as in Example 9. This sample after aging three weeks at 150° C. showed no crazing or cracking, could be unwound from the wire without cracking, and could be bent back and forth on itself repeatedly without cracking. This sample demonstrates the improvement in thermal stress embrittlement gained through the use of polyacrylates in conjunction with an antioxidant.

EXAMPLE 11

A mixture of polyarylene polyether prepared as in Example 1 having a RV of 0.52, and 10 percent polyethylacrylate was prepared as in Examples 2–8 and pressed into an 85-mil sheet. This sheet was compression molded against an etched copper original printing plate to form a matrix having a 50-mil floor. Molding was carried out at 450° F. with a three minute preheat and one minute under pressure. No difficulty was encountered in stripping the matrix from the copper original, that is, no cracks, nor breaks appeared. The matrix faithfully reproduced the original. A similar 50-mil floor matrix formed from an 85-mil sheet of unmodified polyarylene polyether cracked badly when stripped from the original. In addition to improving the impact strength of polyarylene polyethers, polyacrylates also improve the melt flow (processability) of these polymers. Consequently faithful reproduction of an original is possible in shorter molding cycles.

EXAMPLE 12

Thermoplastic polyarylene polyether composed of recurring units having the formula

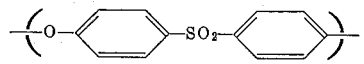

is prepared from 4,4'-dihydroxydiphenylsulfone and 4,4'-dichlorodiphenylsulfone according to the procedure of Example 1. A mixture prepared from this polymer and 3 percent of polyisopropylacrylate exhibits an improvement in notched impact strength and an improvement in resistance to thermal stress embrittlement as compared to the unmodified polymer.

EXAMPLE 13

Thermoplastic polyarylene polyether composed of recurring units having the formula is prepared from the bisphenol of acetophenone and 4,4'-dichlorodiphenylsulfone according to the procedure of Example 1. A mixture prepared from this polymer and 7 percent of polyoctylacrylate exhibits an improvement in notched impact strength and an improvement in resistance to thermal stress embrittlement as compared to the unmodified polymer.

EXAMPLE 14

Thermoplastic polyarylene polyether composed of recurring units having the formula is prepared from the bisphenol of vinyl cyclohexene (prepared by an acid catalyzed condensation of 2 moles of phenol with one mole of vinyl cyclohexene) and 4,4'-dichlorodiphenylsulfone according to the procedure of Example 1. A mixture prepared from this polymer and 20 percent of polyoctadecylacrylate exhibits an improvement in notched impact strength and in improvement in resistance to thermal stress embrittlement as compared to the unmodified polymer.

EXAMPLE 15

Thermoplastic polyarylene polyether composed of recurring units having the formula is prepared from hydroquinone and 4,4'-dichlorodiphenylsulfone according to the procedure of Example 1. A mixture prepared from this polymer and 13 percent of poly-2-methyl-1-butylacrylate exhibits an improvement in notched impact strength and an improvement in resistance to thermal stress embrittlement as compared to the unmodified polymer.

EXAMPLE 16

Thermoplastic polyarylene polyether composed of recurring units having the formula

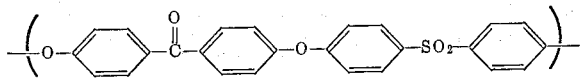

is prepared from 4,4'-dihydroxybenzophenone and 4,4'-dichlorodiphenylsulfone according to the procedure of Example 1. A mixture prepared from this polymer and 10 percent of poly-2-heptylacrylate exhibits an improvement in notched impact strength and an improvement in resistance to thermal stress embrittlement as compared to the unmodified polymer.

EXAMPLE 17

Thermoplastic polyarylene polyether composed of recurring units having the formula

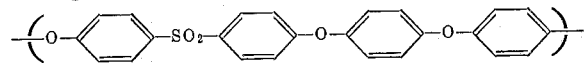

is prepared from 4,4'-dihydroxydiphenylether and 4,4'-dichlorodiphenylsulfone according to the procedure of Example 1. A mixture prepared from this polymer and 2 percent of polymethylmethacrylate exhibits an improvement in notched impact strength and an improvement in resistance to thermal stress embrittlement as compared to the unmodified polymer.

EXAMPLE 18

Thermoplastic polyarylene polyether composed of recurring units having the formula

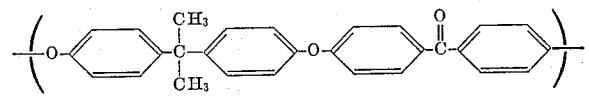

is prepared from 2,2'-bis(4-hydroxyphenyl)propane and 4,4'-difluorobenzophenone according to the procedure of Example 1. A mixture prepared from this polymer and 10 percent of polyhexylmethacrylate exhibits an improvement in notched impact strength and an improvement in resistance to thermal stress embrittlement as compared to the unmodified polymer.

EXAMPLE 19

On a two-roll mill, 252 g. of polyethylacrylate having a RV of 1.94 in cyclohexanone were blended with 101 g. silica. In a separate Banbury mixer, 2270 g. of polyarylene polyether prepared as in Example 1 having a RV of 0.52 was fluxed and the polyethylacrylate-silica mixture added to it. The mixture was blended for ten minutes, cooled, discharged and granulated. Thereafter the mixture was extruded onto 0.032 inch wire (#20 copper wire) using a ¾" Egan extruder with a wire coating die. The compound temperature of the mixture leaving the die was 500° F. and the extruded coating was about 10 mils thick. A control was run in the same manner using unmodified polyarylene polyether. Two sections of the mixture coated wire and one of the control were wound into "pigtails" and aged at 150° C. for four days. The control showed cracking and crazing after aging overnight whereas the mixture coated wire sections did not craze or crack after four days. The Izod impact strength (⅛ notched) of the mixture was 11.2 ft. lbs./in. whereas the control was 1.0 ft. lbs./in. In addition, the polyethylacrylate did not adversely affect the thermal properties of the polyarylene polyether as is evidenced by heat distortion temperature at 364 p.s.i. (ASTM D648) of 172° C. for the mixture as compared to 171° C. for the unmodified polyarylene polyether.

What is claimed is:

1. Polymeric mixture characterized by improved impact strength and improved resistance to thermal stress embrittlement comprising from about 0.1 to about 20 parts by weight of a polyacrylate and a linear thermoplastic polyarylene polyether composed of recurring units having the formula

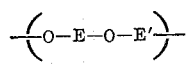

wherein E is the residuum of a dihydric phenol and E' is the residuum of a benzenoid compound having an inert electron withdrawing group having a sigma* value above about 0.7 in at least one of the positions ortho and para to the valence bonds, and where both of said residua are valently bonded to the ether oxygens through aromatic carbon atoms.

2. Mixture defined in claim 1 wherein said polyarylene polyether is composed of recurring units having the formula

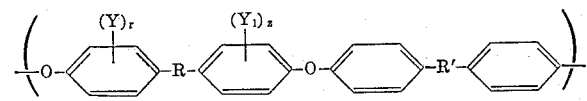

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where R and z are integers having a value from 0 to 4 inclusive.

3. Mixture defined in claim 1 wherein said polyarylene polyether is composed of recurring units having the formula

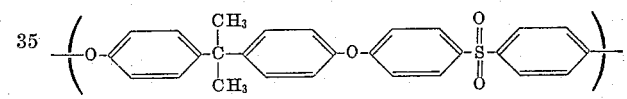

4. Mixture defined in claim 1 wherein said polyarylene polyether is composed of recurring units having the formula

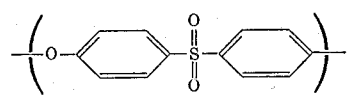

5. A structural element comprising an adherend and adhering thereto a mixture of from about 0.1 to about 20 parts by weight of a polyacrylate and a linear thermoplastic polyarylene polyether composed of recurring units having the formula:

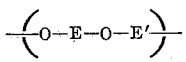

wherein E is the residuum of a dihydric phenol and E' is the residuum of a benzenoid compound having an inert electron withdrawing group having a sigma* value above about 0.7 in at least one of the positions ortho and para to the valence bonds, and where both of said residua are valently bonded to the ether oxygens through aromatic carbon atoms.

6. Structural element of claim 5 wherein said thermoplastic polyarylene polyether is composed of recurring units having the formula

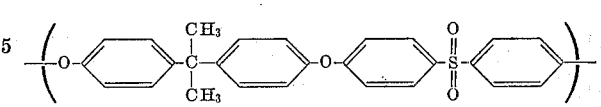

7. Structural element of claim 5 wherein said thermoplastic polyarylene polyether is composed of recurring units having the formula

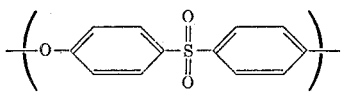

8. Electrical insulating material comprising a mixture of from about 0.1 to about 20 parts by weight of a polyacrylate and a linear thermoplastic polyarylene polyether composed of recurring units having the formula

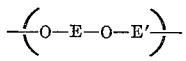

wherein E is the residuum of a dihydric phenol and E' is the residuum of a benzenoid compound having an inert electron withdrawing group having a sigma* value above about 0.7 in at least one of the positions ortho and para to the valence bonds, and where both of said residua are valently bonded to the ether oxygens through aromatic carbon atoms.

9. Electrical conductor coated wtih an insulating material comprising a mixture of from about 0.1 to about 20 parts by weight of polyacrylate and a linear thermoplastic polyarylene polyether composed of recurring units having the formula

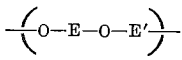

wherein E is the residuum of a dihydric phenol and E' is the residuum of a benzenoid compound having an inert electron withdrawing group having a sigma* value above about 0.7 in at least one of the positions ortho and para to the valence bonds, and where both of said residua are valently bonded to the ether oxygens through aromatic carbon atoms.

10. Molded structure comprising a mixture of from about 0.1 to about 20 parts by weight of polyacrylate and a linear thermoplastic polyarylene polyether composed of recurring units having the formula

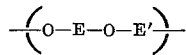

wherein E is the residuum of a dihydric phenol and E' is the residuum of a benzenoid compound having an inert electron withdrawing group having a sigma* value above about 0.7 in at least one of the positions ortho and para to the valence bonds, and where both of said residua are valently bonded to the ether oxygens through aromatic carbon atoms.

11. Matrix formed from a sheet comprising a mixture of from about 0.1 to about 20 parts by weight of polyacrylate and a linear thermoplastic polyarylene polyether composed of recurring units having the formula

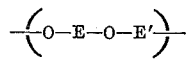

wherein E is the residuum of a dihydric phenol and E' is the residuum of a benzenoid compound having an inert electron withdrawing group having a sigma* value above about 0.7 in at least one of the positions ortho and para to the valence bonds, and where both of said residua are valently bonded to the ether oxygens through aromatic carbon atoms.

12. Matrix of claim 11 wherein said sheet has a thickness of not greater than 75 mils and said matrix has a floor of not greater than 30 mils.

No references cited.

MURRAY TILLMAN, *Primary Examiner.*

J. T. GOOLKASIAN, *Assistant Examiner.*